United States Patent
Blackhurst et al.

(10) Patent No.: US 8,386,327 B2
(45) Date of Patent: Feb. 26, 2013

(54) ONLINE FINANCIAL INSTITUTION PROFILE ELECTRONIC CHECKOUT

(75) Inventors: Jason Blackhurst, Charlotte, NC (US); Matthew Laine Donlan, Charlotte, NC (US); Eric W. Miller, Issaquah, WA (US); Michael W. Upton, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 99 days.

(21) Appl. No.: 12/770,938

(22) Filed: Apr. 30, 2010

(65) Prior Publication Data

US 2011/0191210 A1   Aug. 4, 2011

Related U.S. Application Data

(60) Provisional application No. 61/299,726, filed on Jan. 29, 2010.

(51) Int. Cl.
G06Q 30/00 (2012.01)
(52) U.S. Cl. ...................................... 705/26.1; 705/27.1
(58) Field of Classification Search .................... 705/26, 705/27
See application file for complete search history.

(56) References Cited

U.S. PATENT DOCUMENTS

| | | | | |
|---|---|---|---|---|
| 7,827,115 | B2 * | 11/2010 | Weller et al. ..................... | 705/78 |
| 2005/0210022 | A1 | 9/2005 | Philippe et al. | |
| 2009/0006646 | A1 | 1/2009 | Duarte | |
| 2009/0300097 | A1 | 12/2009 | Meyer | |
| 2009/0313134 | A1 | 12/2009 | Faith et al. | |

OTHER PUBLICATIONS

Strands Launches Online Personal Finance Service—moneyStrands, Anonymous. Business Wire [New York] Mar. 23, 2009, downloaded from ProQuestDirect on the Internet on Nov. 1, 2012, 2 pages.*
Great Britain Search Report for GB1101386.9, dated May 19, 2011.
Website:https://www.google.com/accounts/ServiceLogin?service=sierra&continue=https://checkout.google.com/main?upgrade%3Dtrue&hl=en_US&nui=1&1tmpl=default; 1 page total; downloaded Oct. 8, 2010.
Instituto Mexicano de la Propledad Industrial. Mexican Office Action dated Aug. 23, 2012. Mexican Application No. MX/a/2011/001171. Spanish Language. 5 pages.

* cited by examiner

*Primary Examiner* — James Zurita
(74) *Attorney, Agent, or Firm* — Michael A. Springs; Moore & Van Allen PLLC; Patrick B. Horne

(57) ABSTRACT

Embodiments of the invention provide for methods, apparatuses, and computer program products for providing a financial institution check-out system for processing online transactions using a customer's pre-existing online financial institution profile. A customer desiring to checkout from an online vendor's electronic marketplace is given a choice to checkout using a financial institution's secure checkout widget, which is rendered alongside the customer computer system's web browser application by a financial institution server. The widget authenticates the customer as a financial institution account owner, and the financial institution server displays to the customer his or her available payment accounts and receives customer input regarding the desired payment account. The server runs a payment service engine that controls payment for the transaction, and then the widget communicates proof of successful payment to the vendor server. The vendor server receives payment confirmation from the financial institution server and thereafter communicates successful payment confirmation to the customer via the vendor's checkout interface.

29 Claims, 11 Drawing Sheets

ONLINE FINANCIAL INSTITUTION PROFILE ELECTRONIC CHECKOUT

CLAIM OF PRIORITY UNDER 35 U.S.C. §119

This Non-Provisional Patent Application claims priority to Provisional Patent Application Ser. No. 61/299,726 titled "Financial Institution-Specific Online Check-out System," filed Jan. 29, 2010, assigned to the assignee hereof, and hereby expressly incorporated by reference herein.

FIELD

In general, embodiments of the invention relate to methods, apparatuses, and computer program products for providing an electronic checkout for financial institution customers using an online financial institution profile.

BACKGROUND

The advent of the Internet has provided merchants with new channels for reaching customers and providing information regarding their products (i.e., goods and/or services). The Internet also provides customers with the ability to purchase those products without leaving their computer. However, customers who shop online typically must provide the merchant sensitive information such as account identification information, for example a credit card number, expiration data and zip code of residence of the account owner. Providing sensitive information to an online merchant, which may or may not be a trustworthy entity or individual, creates a significant security risk.

In online transactions, either a customer provides necessary transaction information, such as shipping and/or billing information each time she engages in a transaction with a merchant, or the customer sets-up a customer account with the merchant to store requisite transaction information and imports the data from the customer account at the time of the transaction. Having the customer provide the necessary transaction information each time she engages in a transaction with the merchant is a burdensome and time-consuming task that impedes check-out and makes online shopping less desirable. Moreover, setting up accounts with each online merchant is also a time-consuming endeavor and poses a security risk in the event that the customer accounts are compromised. Therefore, a need exists to for effective systems and techniques for providing fast and secure checkout processes on the Internet (i.e., on the "web").

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., systems, computer program products, and/or other devices), methods, or a combination of the foregoing for providing a financial institution check-out system for processing online transactions using a customer's pre-existing online financial institution profile. A customer desiring to checkout from an online vendor's electronic marketplace is given a choice to checkout using a financial institution's secure checkout widget, which is rendered proximate (e.g., within or alongside of) the customer computer system's web browser application by a financial institution server. The widget authenticates the customer as a financial institution account owner using, for example, the pre-existing authentication information and procedures that have already been established for authenticating the customer into the financial institution's online banking website. After authentication, the financial institution server displays to the customer his or her available payment accounts and receives customer input regarding the desired payment account. The server runs a payment service engine that controls payment for the transaction, and then the widget communicates proof of successful payment to the vendor server. The vendor server receives payment confirmation from the financial institution server and thereafter communicates successful payment confirmation to the customer via the vendor's checkout interface. In this way, in some embodiments of the invention, any consumer that banks with the financial institution can easily and securely make online payments without having to take the time to create a new account with a new entity and without having to share sensitive information with vendors. Instead, the financial institution's already robust and secure authentication procedures that are used for authenticating a user of an online banking website can now be used to assist a user with paying for products purchased over the Internet.

According to embodiments of the present invention, a method provides an electronic checkout using an online financial institution profile for a customer of a financial institution interacting with an electronic marketplace of a vendor with the customer purchasing one or more products via the electronic marketplace. The method includes rendering a financial institution widget proximate a web browser running on a customer computer system; authenticating the customer as a financial institution account owner based at least in part on the customer's online financial institution profile and on authentication input received from the customer via the financial institution widget; identifying a payment account based at least in part on the authenticating the customer; processing payment for the one or more products using the payment account; and communicating proof of a successful payment to the vendor. In some embodiments, before rendering the financial institution widget, the method includes receiving a request to render the financial institution checkout widget. In other embodiments, before rendering the financial institution widget, the method includes receiving transaction information comprising information related to the one or more products being purchased.

In some embodiments, authenticating the customer as a financial institution account owner includes retrieving the online financial institution profile comprising online financial institution authentication information; receiving customer authentication input; and comparing the retrieved online financial institution authentication information with the received customer authentication input thereby authenticating the customer as a financial institution account owner. In some such embodiments, the online authentication information includes a stored username, a stored pass code, and at least one stored mutual authentication tool. Receiving customer authentication input includes receiving a customer username, a customer pass code, and a customer acceptance of the at least one stored mutual authentication tool.

In some embodiments, identifying the payment account based at least in part on authenticating the customer includes retrieving, from the online financial institution profile, identification information regarding the customer's one or more accounts maintained by the financial institution; and receiving customer input regarding which of the one or more accounts to use as the payment account. In some such embodiments, the method also includes displaying, before receiving customer input regarding the desired payment account, the customer's one or more accounts accessible for payment during checkout.

In some embodiments, the method includes receiving transaction information about the purchase transaction from the vendor; and storing the transaction information in a memory device. In some such embodiments, the transaction information includes total cost, and the processing the payment includes communicating the total cost to the payment service. In some such embodiments, processing the payment also includes receiving confirmation from the payment service of successful payment or payment authorization from one or more of the customer's accounts to a vendor account for an amount based at least in part on the total cost.

In some embodiments, communicating proof of a successful payment to the vendor includes communicating a successful payment artifact to the financial institution widget for communication from the financial institution widget to the vendor electronic marketplace and thereby a vendor server; receiving a request for proof of payment from the vendor server, the request based at least in part on the successful payment artifact; and communicating proof of successful payment or payment authorization to the vendor server. In some such embodiments, communicating proof of a successful payment to the vendor further includes instructing the vendor server to confirm successful payment or payment authorization to the customer using the vendor electronic marketplace.

In some embodiments, rendering the financial institution widget proximate the web browser running on the customer computer system includes rendering the financial institution widget proximate a vendor's checkout webpage running on the customer computer system. In some such embodiments, rendering the financial institution widget proximate a vendor's checkout webpage running on the customer computer system includes rendering the financial institution widget within the vendor's checkout webpage.

In some embodiments, the financial institution comprises a bank, and the customer's online financial institution profile comprises the customer's online banking profile used to authenticate the customer into an account of an online banking service.

According to embodiments of the present invention, a computer program product includes a non-transitory computer-readable medium including computer executable instructions. The instructions provide an electronic checkout using an online financial institution profile for a customer of a financial institution interacting with an electronic marketplace of a vendor, the customer desiring to purchase one or more products via the electronic marketplace. The instructions include instructions for rendering a financial institution widget proximate a web browser running on a customer computer system; instructions for authenticating the customer as a financial institution account owner based at least in part on the customer's online financial institution profile and on authentication input received from the customer via the financial institution widget; instructions for identifying a payment account based at least in part on the authenticating of the customer; instructions for processing payment for the one or more products using the payment account; and instructions for communicating proof of a successful payment to the vendor. In some embodiments, the instructions also include instructions for receiving a request to render the financial institution checkout widget. In some embodiments, the instructions also include instructions for receiving transaction information comprising information related to the one or more products being purchased.

In some embodiments, the instructions for authenticating the customer as a financial institution account owner include instructions for retrieving the online financial institution profile comprising online financial institution authentication information; instructions for receiving customer authentication input; and instructions for comparing the retrieved online financial institution authentication information with the received customer authentication input thereby authenticating the customer as a financial institution account owner. In some such embodiments, the online authentication information comprises a stored username, a stored pass code, and at least one stored mutual authentication tool, and the instructions for receiving customer authentication input include instructions for receiving a customer username, a customer pass code, and a customer acceptance of the at least one stored mutual authentication tool.

In some embodiments, the instructions for identifying the payment account based at least in part on the authenticating the customer include instructions for retrieving, from the online financial institution profile, identification information regarding the customer's one or more accounts maintained by the financial institution; and instructions for receiving customer input regarding which of the one or more accounts to use as the payment account. In some such embodiments, the instructions also include instructions for displaying the customer's one or more accounts accessible for payment during checkout.

In some embodiments, the instructions also include instructions for receiving transaction information about the purchase transaction from the vendor; and instructions for storing the transaction information in a memory device. In some such embodiments, the transaction information includes total cost, and the instructions for processing the payment include communicating the total cost to the payment service. In some such embodiments, the instructions for processing the payment also include instructions for receiving confirmation from the payment service of successful payment or payment authorization from one or more of the customer's accounts to a vendor account for an amount based at least in part on the total cost.

In some embodiments, the instructions for communicating proof of a successful payment to the vendor include instructions for communicating a successful payment artifact to the financial institution widget for communication from the financial institution widget to the vendor electronic marketplace and thereby a vendor server; instructions for receiving a request for proof of payment from the vendor server, the request based at least in part on the successful payment artifact; and instructions for communicating proof of successful payment or payment authorization to the vendor server.

In some embodiments, the instructions for rendering the financial institution widget proximate the web browser running on the customer computer system include instructions for rendering the financial institution widget proximate a vendor's checkout webpage running on the customer computer system. In some such embodiments, the instructions for rendering the financial institution widget proximate a vendor's checkout webpage running on the customer computer system include instructions for rendering the financial institution widget within the vendor's checkout webpage.

In some embodiments, the financial institution comprises a bank, and the customer's online financial institution profile includes the customer's online banking profile used to authenticate the customer into an account of an online banking service.

According to embodiments of the present invention, an apparatus provides an electronic checkout using an online financial institution profile for a customer of a financial institution interacting with an electronic marketplace of a vendor, the customer desiring to purchase one or more products via the electronic marketplace. The apparatus includes means for rendering a financial institution widget proximate a web browser running on a customer computer system, the financial institution widget configured to receive authentication input from the customer; means for authenticating the customer as a financial institution account owner based at least in part on the customer's online financial institution profile and on the authentication input received from the customer via the financial institution widget; means for identifying a payment account associated with the customer's online financial institution profile; means for processing a payment for the one or more products using the payment account and based on the authentication of the customer; and means for communicating proof of a successful payment to the vendor. In some embodiments, the means for authenticating the customer as a financial institution account owner includes means for retrieving the online financial institution profile comprising online financial institution authentication information; means for receiving customer authentication input; and means for comparing the retrieved online financial institution authentication information with the received customer authentication input thereby authenticating the customer as a financial institution account owner. In some embodiments, the means for communicating proof of a successful payment to the vendor includes means for communicating a successful payment artifact to the financial institution widget for communication from the financial institution widget to the electronic marketplace and thereby a vendor server; means for receiving a request for proof of payment from the vendor server, the request based at least in part on the successful payment artifact; and means for communicating proof of successful payment to the vendor server.

According to embodiments of the present invention, a system provides an electronic checkout using an online financial institution profile for a customer of a financial institution interacting with an electronic marketplace of a vendor, the customer desiring to purchase one or more products via the electronic marketplace. The system includes a financial institution server including a non-transitory memory configured for storing computer readable instructions and a processing device configured for executing one or more of the computer readable instructions. The one or more computer readable instructions instruct the processing device to render a financial institution widget proximate a vendor web page running on a customer computer system, and authenticate the customer as a financial institution account owner based at least in part on the customer's online financial institution profile and on authentication input received from the customer via the financial institution widget; process a payment for the one or more products based at least in part on authentication of the customer; and communicate proof of a successful payment to the vendor.

According to embodiments of the present invention, an apparatus facilitates a customer's electronic purchase of a product from a vendor's website. The apparatus includes a communication device configured to receive from the customer a request to purchase the product from the vendor's website, wherein the communication device is further configured to receive from the customer authentication information used by the customer to authenticate the customer into an account on a web-based banking system. The apparatus also includes a memory device comprising the customer's banking profile stored therein; and a processing device communicably coupled to the communication device and the memory device and configured to compare the authentication information to the customer's banking profile, wherein the processing device is further configured to process a payment to the vendor for purchase of the product based at least partially on comparison of the authentication information to the customer's banking profile.

According to embodiments of the present invention, a method facilitates a customer's electronic purchase of a product from a vendor's website. The method includes receiving from the customer an electronic request to purchase the product from the vendor's website; receiving from the customer electronic authentication information used by the customer to access the customer's account on a web-based banking system; comparing, using a computer, the electronic authentication information to the customer's banking profile; and processing a payment to the vendor for purchase of the product based at least partially on the comparison of the electronic authentication information to the customer's banking profile.

The following description and the annexed drawings set forth in detail certain illustrative features of one or more embodiments of the invention. These features are indicative, however, of but a few of the various ways in which the principles of various embodiments may be employed, and this description is intended to include all such embodiments and their equivalents.

BRIEF DESCRIPTION OF THE DRAWINGS

Figure 1:
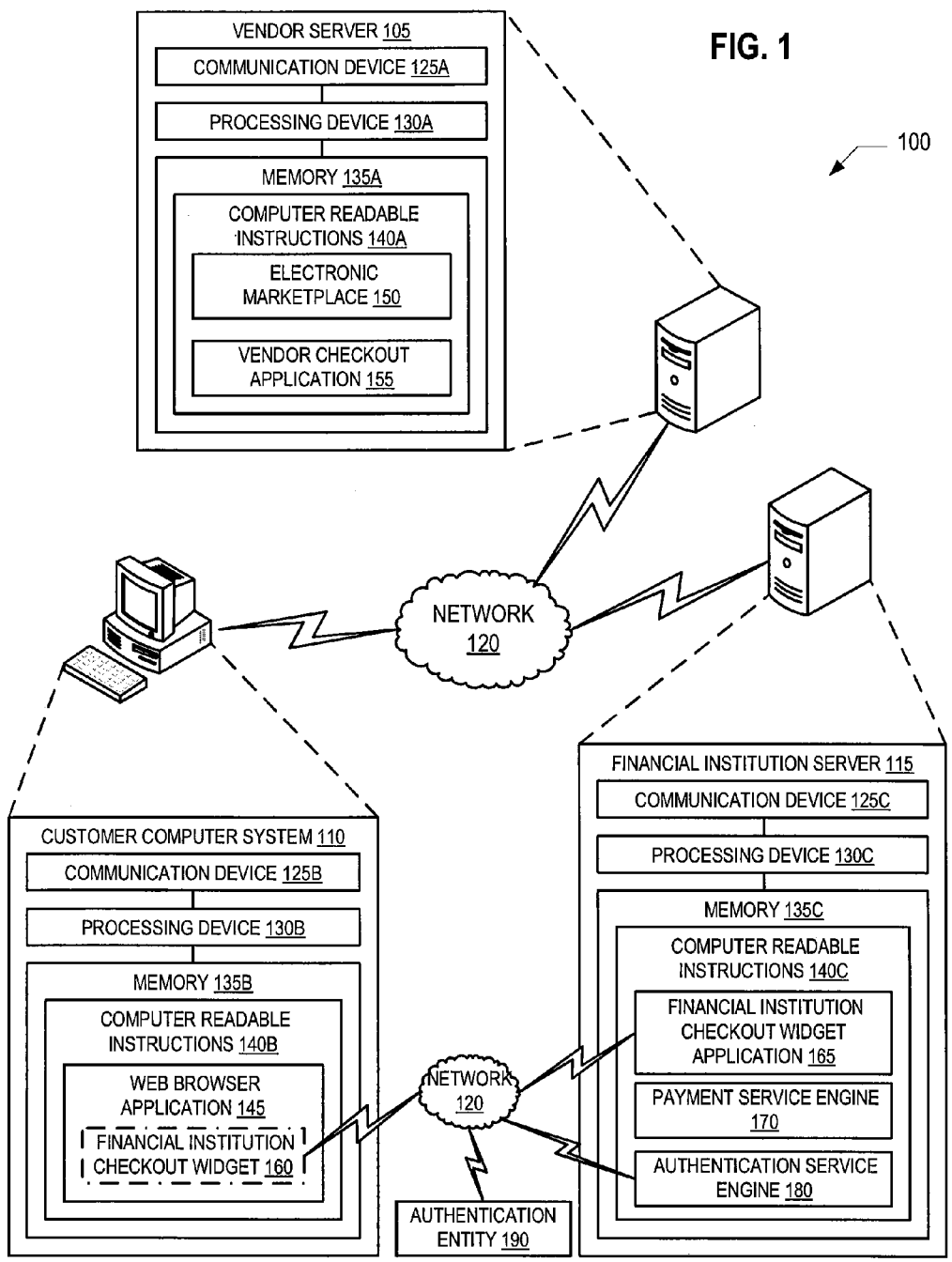
Figure 2:
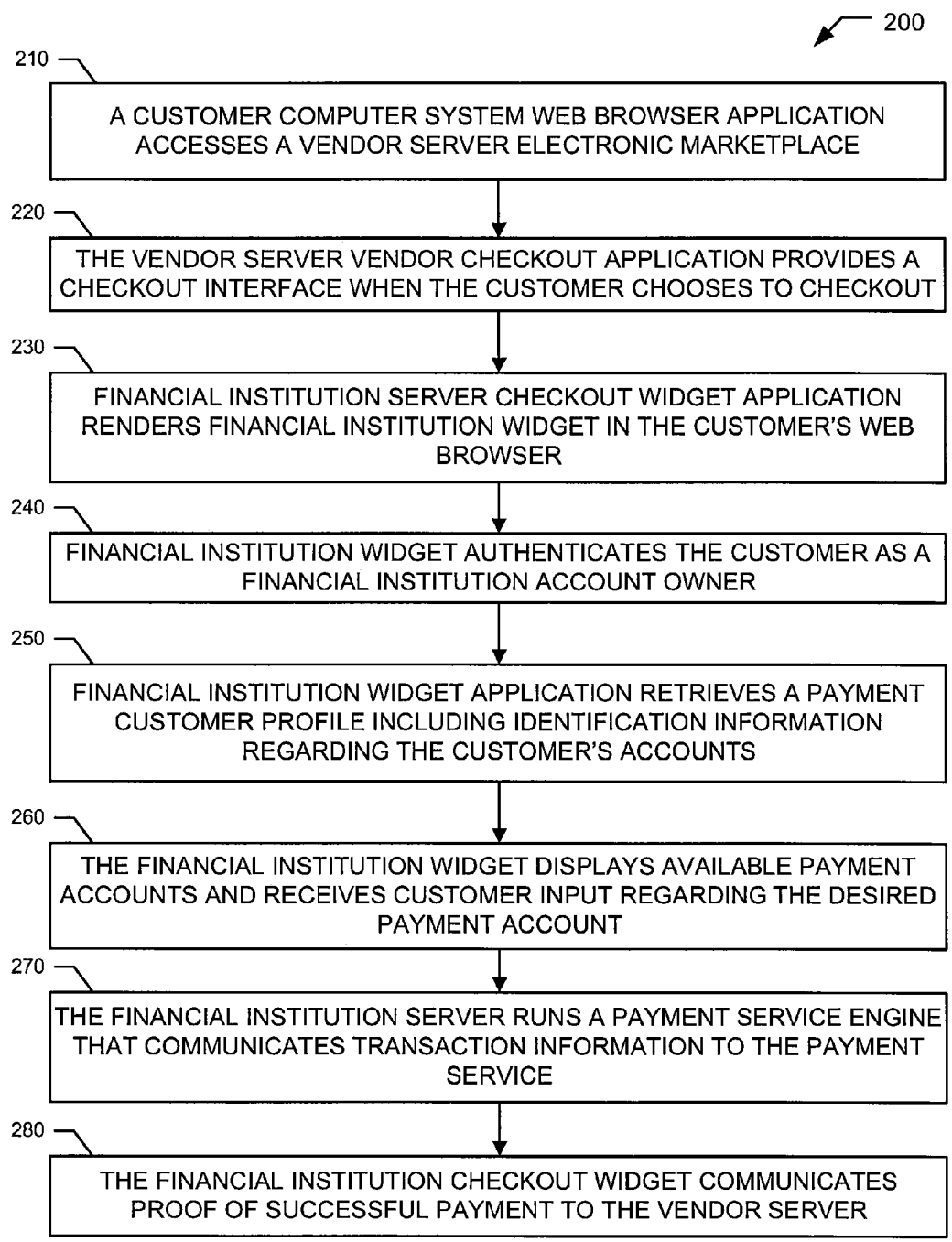
Figure 3:
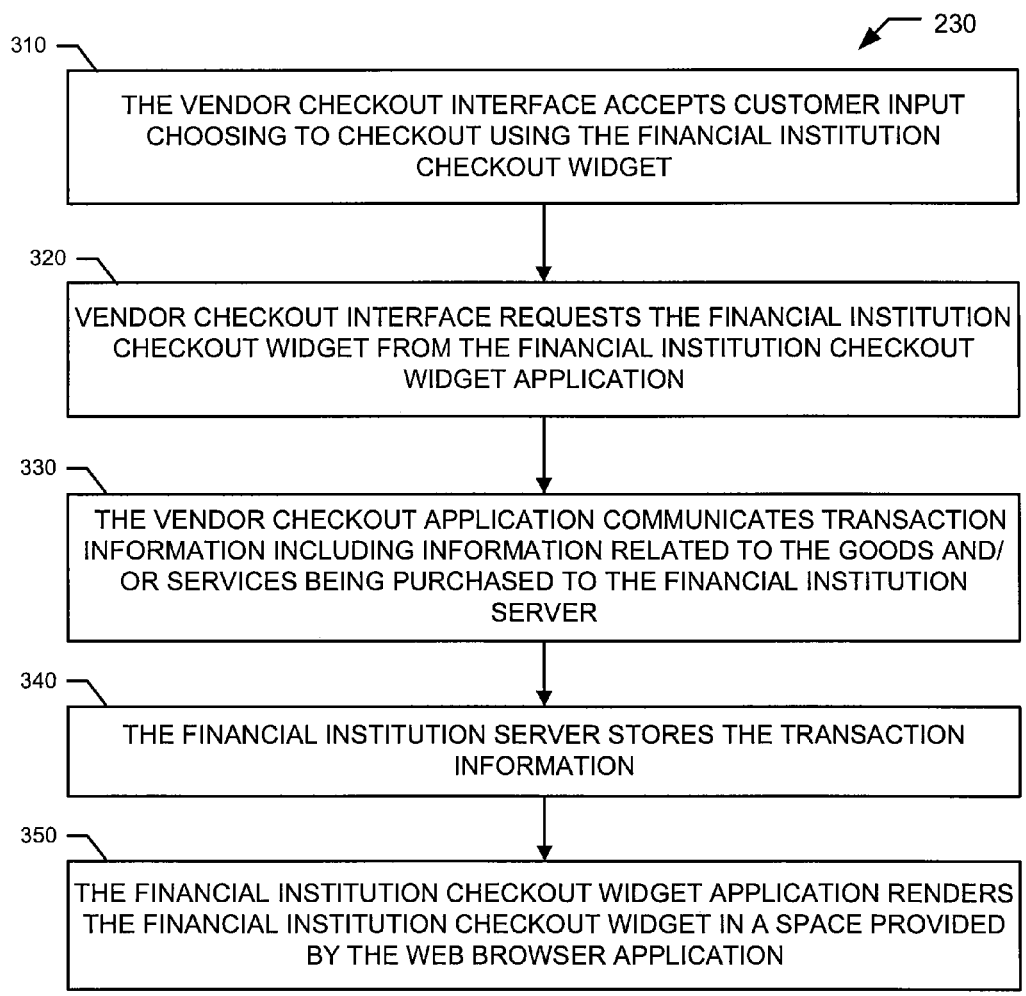
Figure 4:
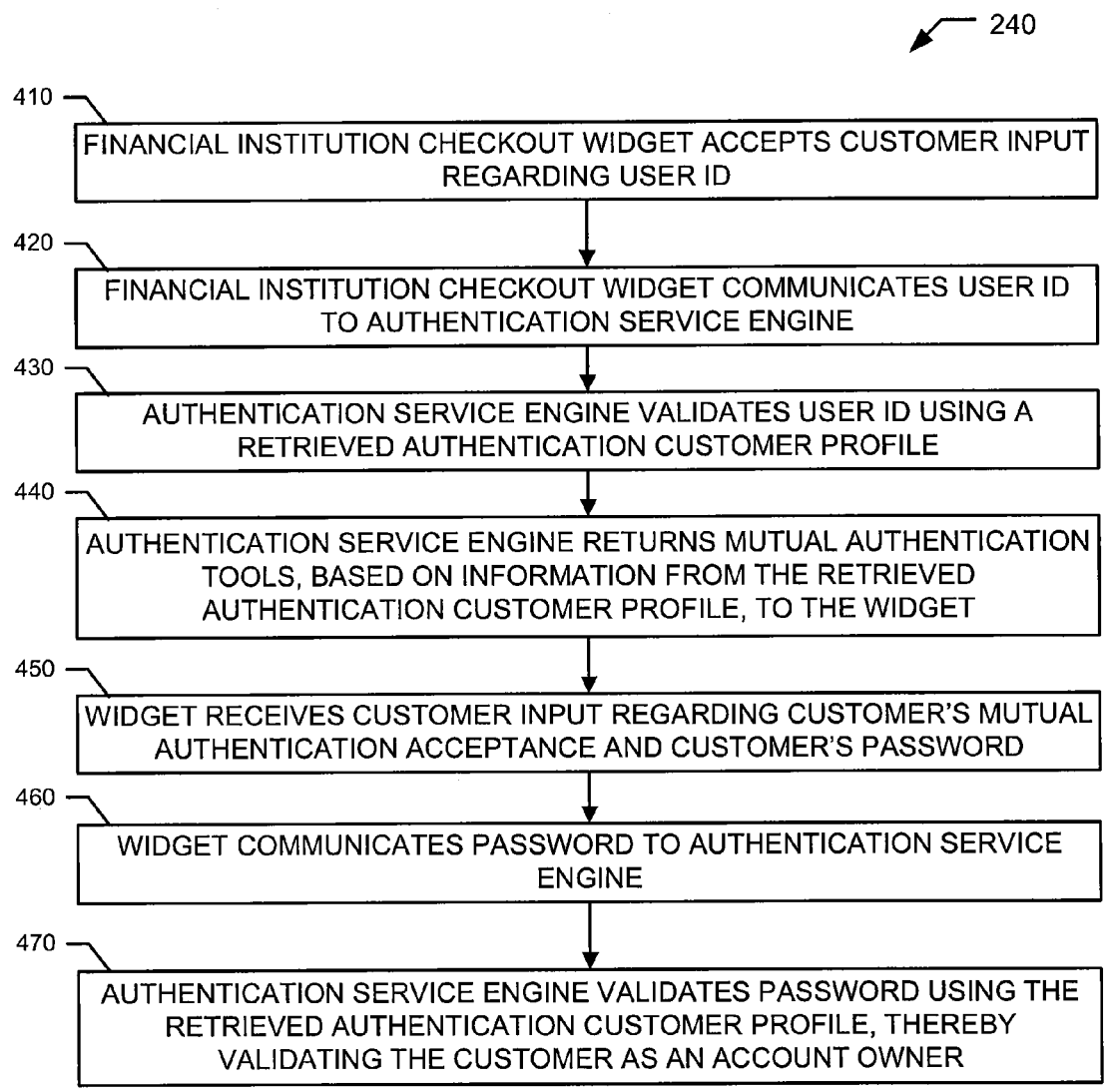
Figure 5:
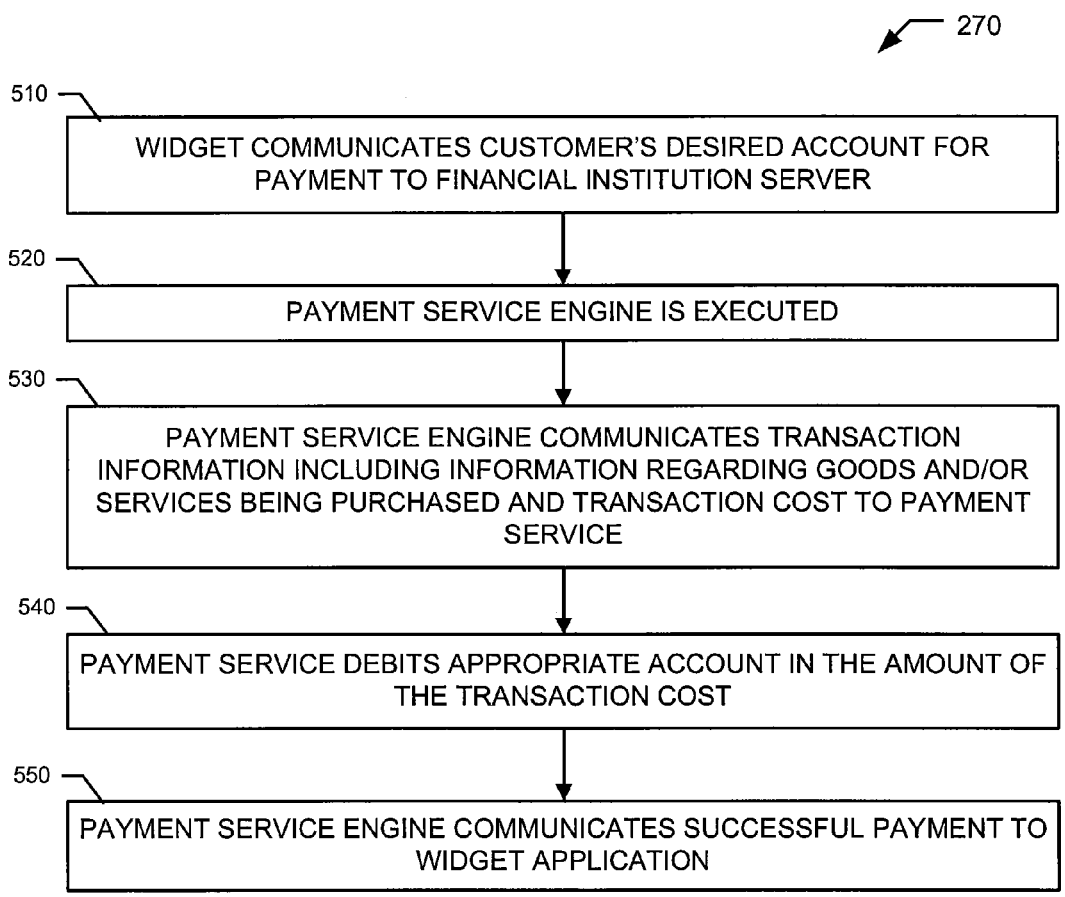
Figure 6:
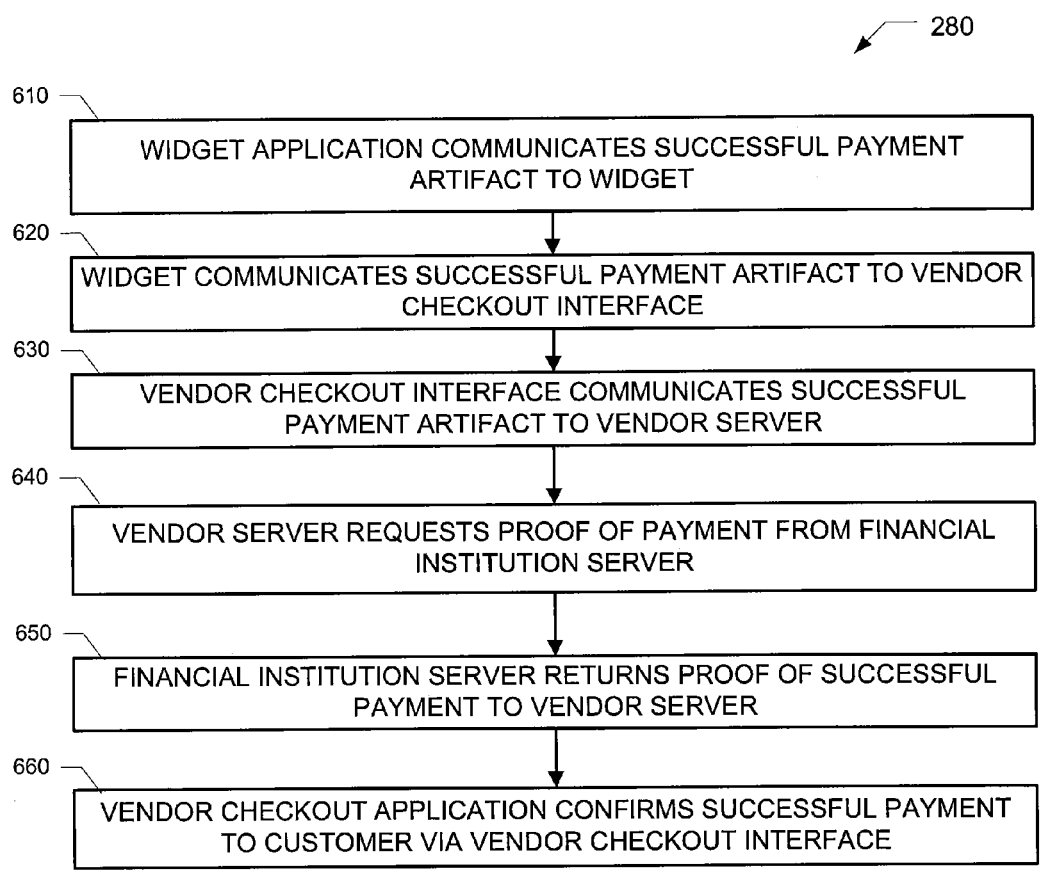
Figure 7:
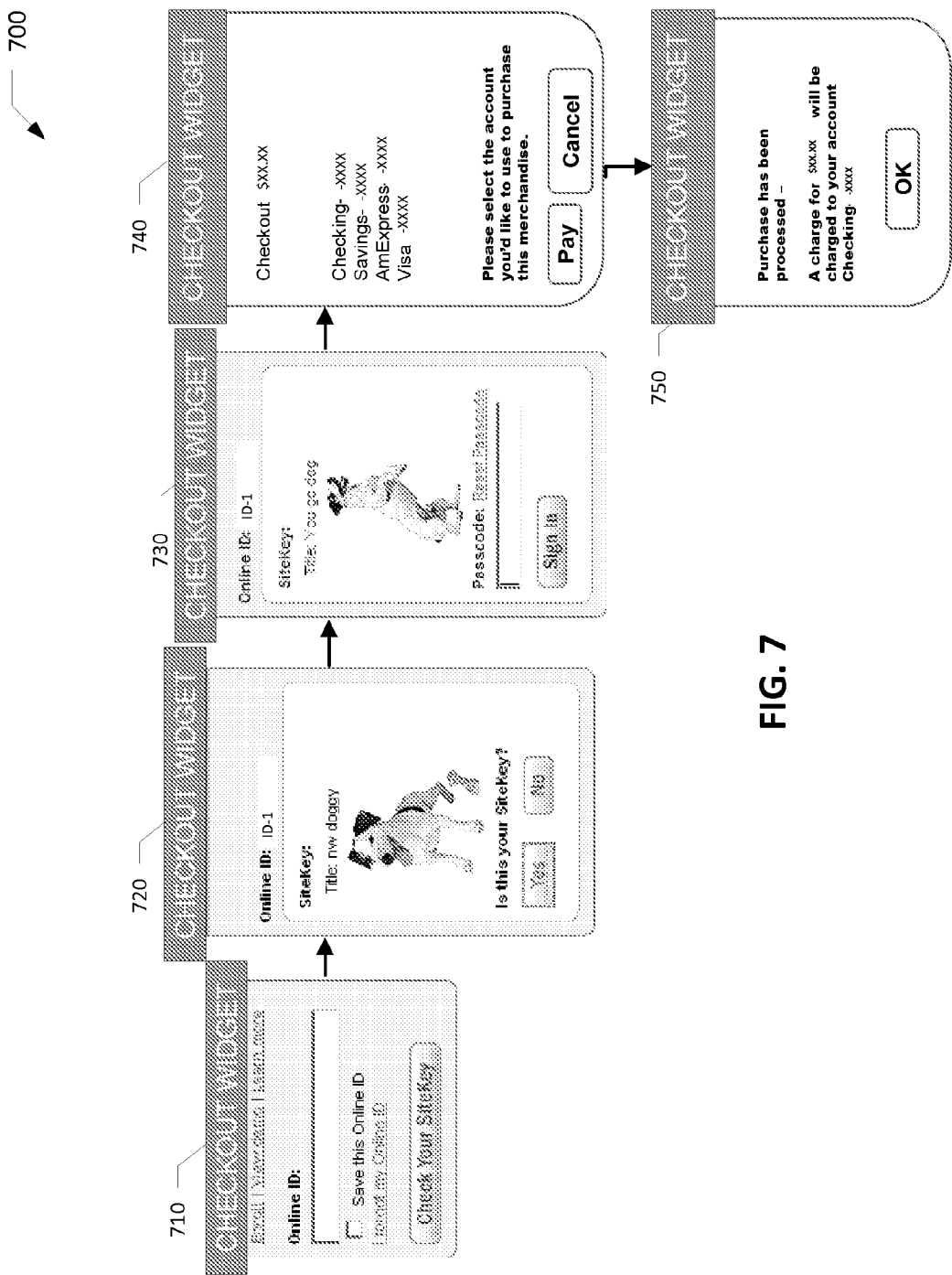
Figure 8A:
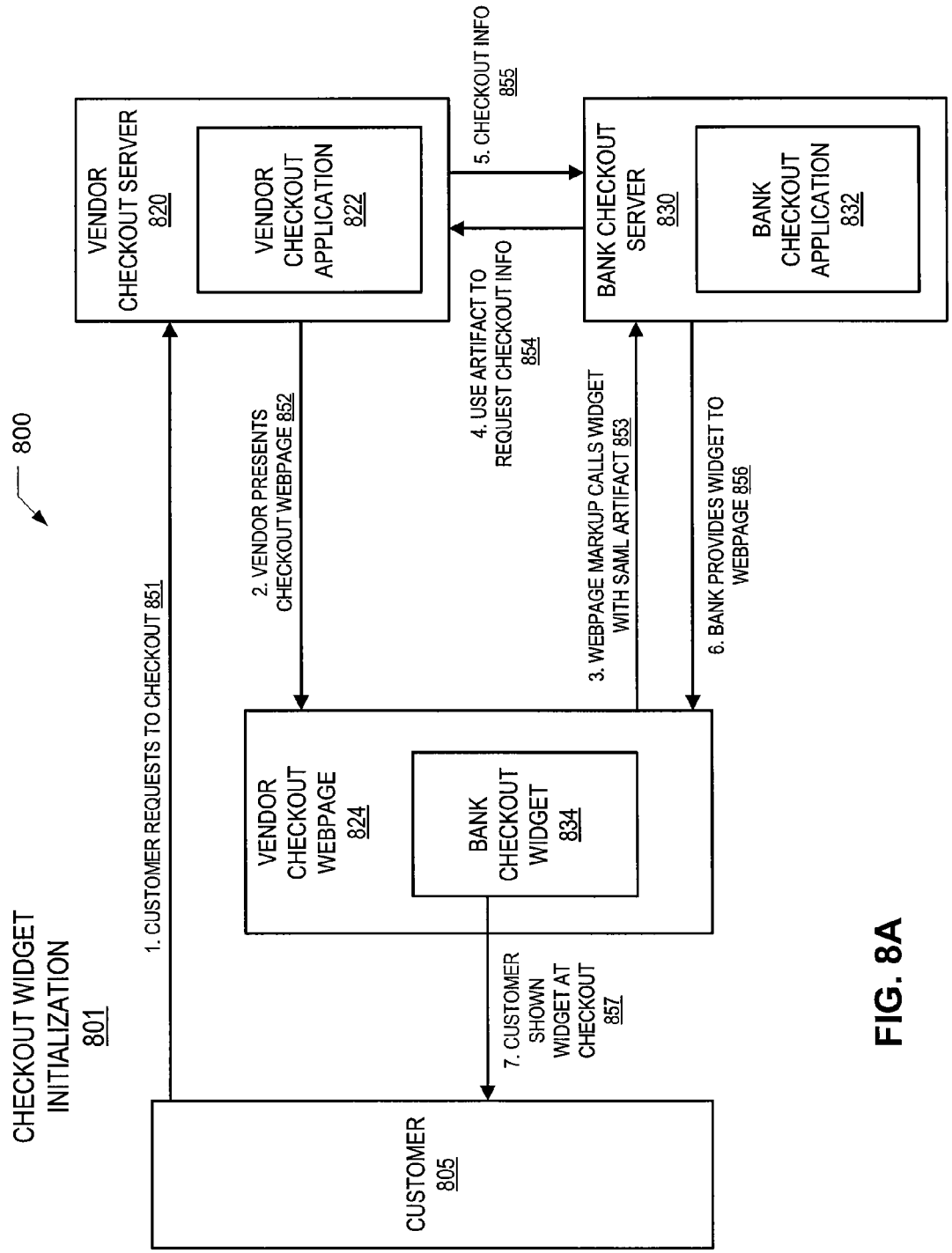
Figure 8B:
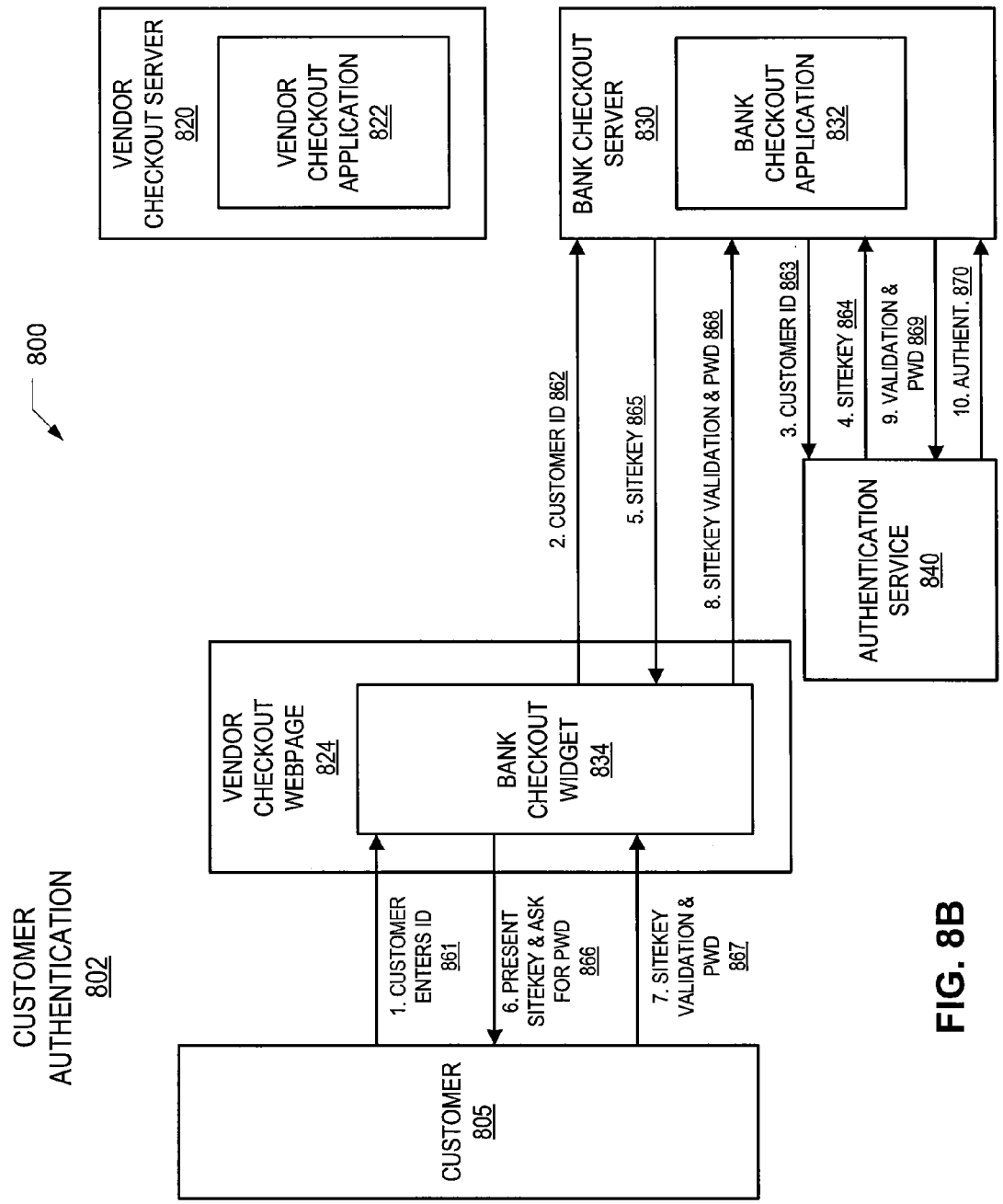
Figure 8C:
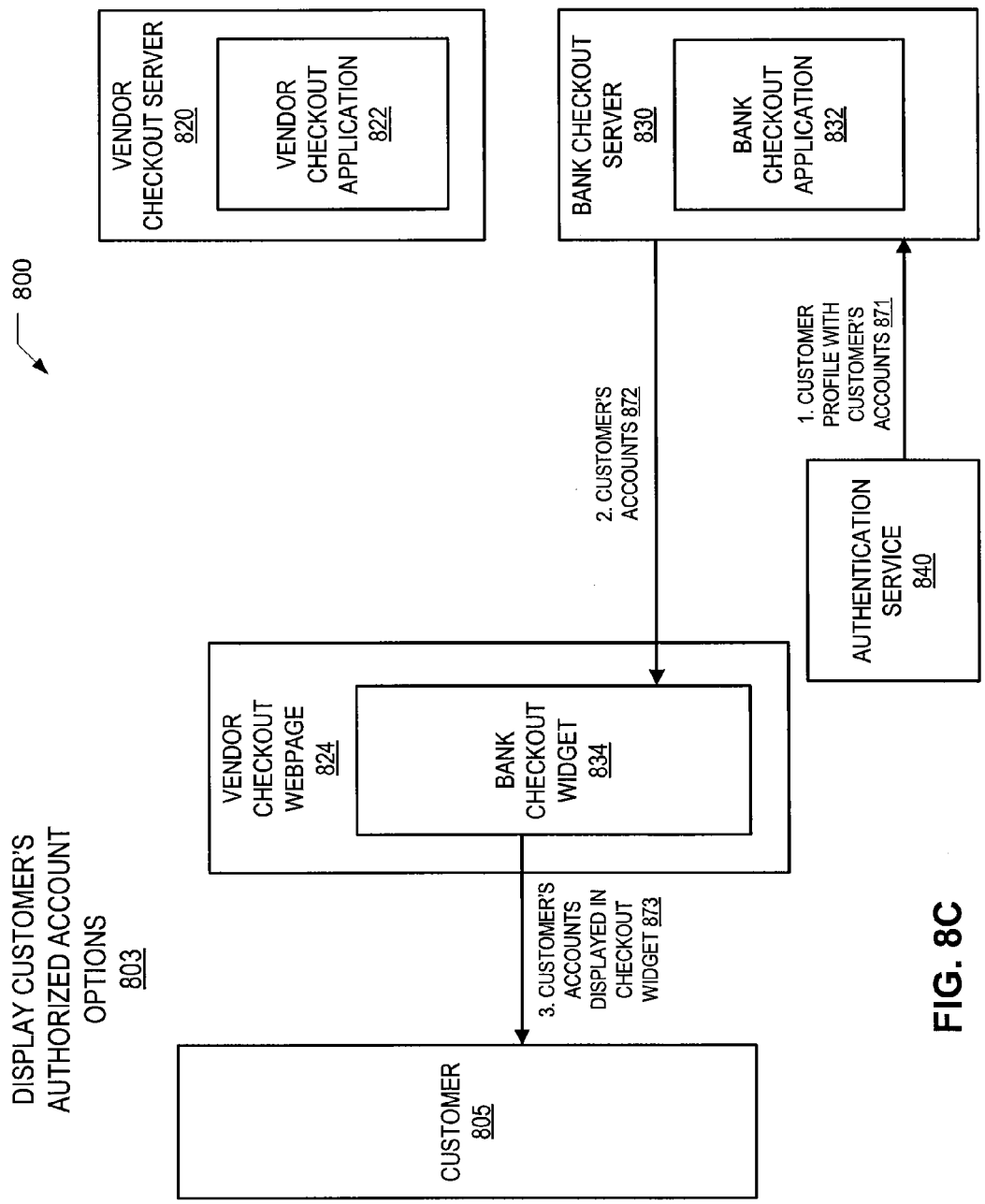
Figure 8D:
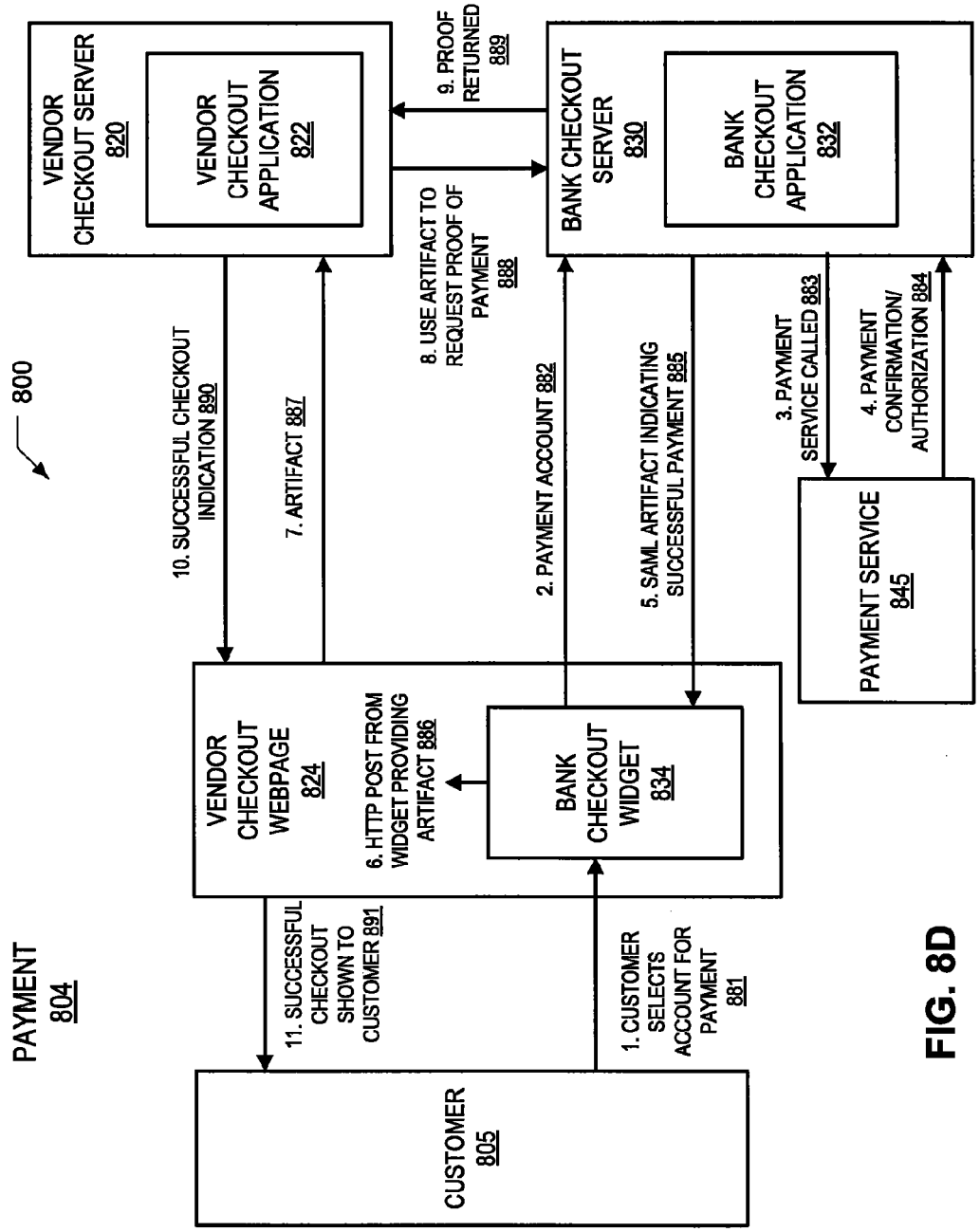

Having thus described embodiments of the invention in general terms, reference will now be made to the accompanying drawings, wherein:

FIG. 1 is a block diagram of an online financial institution profile electronic checkout environment according to an embodiment of the present invention;

FIG. 2 is a flowchart illustrating an online financial institution profile electronic checkout process according to an embodiment of the present invention;

FIG. 3 is a flowchart illustrating additional details of the financial institution server checkout widget application rendering the financial institution widget in the customer's web browser according to an embodiment of the present invention;

FIG. 4 is a flowchart illustrating additional details of the financial institution widget authenticating the customer as a financial institution account owner according to an embodiment of the present invention;

FIG. 5 is a flowchart illustrating additional details of the financial institution server running a payment service engine according to an embodiment of the present invention;

FIG. 6 is a flowchart illustrating additional details of the financial institution checkout widget communicating proof of successful payment to the vendor server according to an embodiment of the present invention;

FIG. 7 is a diagram illustrating the financial institution checkout widget according to an embodiment of the present invention;

FIG. 8A is a combination block and flow diagram illustrating a widget initialization procedure of one example embodiment of an online banking profile electronic checkout system according to an embodiment of the present invention;

FIG. 8B is a combination block and flow diagram illustrating a customer authentication procedure of one example embodiment of an online banking profile electronic checkout system according to an embodiment of the present invention;

FIG. 8C is a combination block and flow diagram illustrating a customer account displaying procedure of one example embodiment of an online banking profile electronic checkout system according to an embodiment of the present invention; and FIG. 8D is a combination block and flow diagram illustrating a payment procedure of one example embodiment of an online banking profile electronic checkout system according to an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the invention provide for systems, methods, apparatuses and computer program products for providing a financial institution check-out system for processing online transactions using a customer's pre-existing online financial institution profile. A customer desiring to checkout from an online vendor's electronic marketplace is given a choice to checkout using a financial institution's secure checkout widget, which is rendered proximate (e.g., within or alongside of) the customer computer system's web browser application by a financial institution server. The widget authenticates the customer as a financial institution account owner using, for example, the pre-existing authentication information and procedures that have already been established for authenticating the customer into the financial institution's online financial website. After authentication, the financial institution server displays to the customer his or her available payment accounts and receives customer input regarding the desired payment account. The server runs a payment service engine that controls payment for the transaction, and then the widget communicates proof of successful payment to the vendor server. The vendor server receives payment confirmation from the financial institution server and thereafter communicates successful payment confirmation to the customer via the vendor's checkout interface. As used herein, the vendor may be any entity, apart from the financial institution, that sells products (i.e., goods or services) online (i.e., on the Internet or a similar network) or engages in other online transactions. For example, the vendor may be an online merchant, retailer, wholesaler, distributor, marketer, advertiser, manufacturer, and/or the like.

It should be appreciated that, in some embodiments of the invention, any consumer that banks with the financial institution can easily and securely make online payments without having to take the time to create a new account with a new entity and without having to share sensitive information with vendors. Instead, the financial institution's already robust and secure authentication procedures that are used for authenticating a user of an online banking website can now be used to assist a user with paying for products purchased over the Internet.

Referring to FIG. 1, a block diagram of an online banking profile electronic checkout environment 100 in accordance with some embodiments of the present invention is illustrated. As illustrated, the vendor server 105 is operatively coupled, across a network 120, to one or more customer computer systems 110 and one or more financial institution servers 115. The vendor server 105 includes a communication device 125A configured for communicating across the network 120 with the customer computer system 110 and the financial institution server 115 and, in some embodiments, other devices, computers, systems, servers or the like. The vendor server 115 also includes one or more processing devices 130A. Processing device 130A controls the communication device 125A and is configured for accessing a memory 135A configured for storing computer readable or executable instructions 140A. The processing device 125A is configured for accessing and executing the computer readable instructions stored in or at the memory device 135A.

In the illustrated embodiment, the computer readable instructions 140A include an electronic marketplace application 150, which is configured for rendering an electronic marketplace on the customer's web browser. In one embodiment, for example, the vendor is an online merchant and the electronic marketplace is the merchant's online store including one or more good and/or services listed for sale and/or lease. Associated with the vendor's electronic marketplace is typically a vendor checkout application 155. The vendor checkout application 155, in some embodiments, renders a checkout webpage on the customer's web browser once the customer has chosen his or her purchases and chosen a checkout option. The vendor checkout application 155 is configured for walking the customer through an online transaction whereby the customer, in typical applications, inputs customer payment information such as information regarding a payment device, for example, a debit card, credit card, or third party payment option such as that provided by PayPal®. As provided by embodiments of the present invention, however, the vendor checkout application 155 is associated with the financial institution checkout widget application 165 of the financial institution server 165 such that the customer is enabled to provide online banking profile information for authentication by the financial institution server 115 and thereby complete the transaction discretely, securely, and efficiently.

The customer computer system 110 also includes a communication device 125A configured for communicating with the vendor server 105 and the financial institution server 115 and, in some embodiments, other devices, computers, systems, servers, or the like. The customer computer system 110 also includes one or more processing devices 130B configured for controlling the communication device 125B and accessing the memory 135B. The memory is configured for storing computer readable and executable instructions 140B, which include a web browser application 145B. The processing device is configured for reading and executing the web browser application 145B thereby providing the customer a web browser displayed on the customer computer system 110 for navigating the network 120, such as, for example, visiting web pages via the Internet. In one embodiment, for example, the web browser application 145B interacts with the electronic marketplace 150 of the vendor server 105 such that the web browser displays the vendor's electronic marketplace 150 to the customer.

According to some embodiments of the present invention, and as discussed in further detail below, the web browser application interacts with a financial institution checkout widget 160 rendered in association with the web browser by the financial institution checkout widget application 165 of the financial institution server 115.

The financial institution server 115 includes a communication device 125C configured for communicating over the network 120 with the customer computer system 110 and the vendor server 105 and, in some embodiments, other devices, computers, systems, servers or the like. The financial institution server 115 also includes one or more processing devices 130C configured for controlling the communication device 125C and accessing a memory 135C. The memory 135C is configured for storing computer readable and executable instructions 140C including a financial institution checkout widget application 165. As briefly discussed above, the financial institution checkout widget application 165, in some embodiments, includes instructions for rendering the financial institution checkout widget 160 associated with the web browser application 145B of the customer computer system 110. Specifically, in some embodiments, the financial institution checkout widget application 165, upon proper prompting from the customer computer system 110 renders the financial institution checkout widget within a space or division of the web browser. Thus, once the financial institution checkout widget application 165 has rendered the financial institution checkout widget 160, the web browser is providing the customer information generated from multiple sources, specifically the web browser application 145B of the computer readable instructions 140B stored at the customer computer system 110 as well as the financial institution checkout widget application 165 of the computer readable instructions 140C of the financial institution server 115.

As illustrated in FIG. 1, the financial institution checkout widget is depicted by a block with a dotted border and connected, across the network 120 with the financial institution checkout widget application 165. This depiction is intended to represent the association between the financial institution checkout widget 160 having been rendered by, and in communication with, the financial institution checkout widget application 165. While the financial institution checkout widget 160 is shown as part of the web browser application, in some embodiments, the financial institution checkout widget 160 is not a part of the web browser application, but rather, as discussed above, is actually a product of the financial institution checkout widget application 165. The financial institution checkout widget 160 is shown as part of the web browser application 145B solely to indicate the close relationship between the financial institution checkout widget 160 and the web browser rendered by the web browser application 145B.

Turning back to the financial institution server, a payment service engine 170 is also included in the computer readable instructions 140C. The payment service engine 170 is configured for calling a payment service with transaction payment information upon prompting from the processing device 130C of the financial institution server 115. As discussed below in further detail, the payment service engine 170 is prompted, for example, to call the payment service with transaction payment information after the financial institution checkout widget 160 has communicated the customer's online banking profile information for successful authentication. Stepping backwards in the process, which is discussed in greater detail below, the financial institution checkout widget 160, in some embodiments, is not rendered before the customer computer system has communicated various pieces of information regarding the transaction to the financial institution server 115. For example, the customer computer system 110, in one embodiment, communicates identification information and quantity information regarding the products being purchased as well as total information regarding the total of charges associated with the products being purchased. Referring back to the payment service engine 170, once the financial institution checkout widget 160 has communicated the customer's online banking profile information for successful authentication, the payment service engine 170 is configured for communicating the various transaction information such as, for example, the identification information, quantity information, total information, and/or combinations of the same to a payment service as discussed further below.

The financial institution server 115 also includes an authentication service engine 180 configured for accessing customer online account profile information stored either at the financial institution server 115 or another location such as an authentication entity 190. In various embodiments, the authentication entity 190 is an authentication server separate from the financial institution server 115, and in other embodiments, the authentication entity 190 is a third party, that is, the authentication entity 190 is not the financial institution, the vendor or the customer. In some embodiments, the authentication entity 190 is also dedicated to storing customer account information and profiles, but in other embodiments, the customer account information and profiles are stored at another location such as a separate datastore server or database or at the financial institution server 115. In some embodiments, the authentication service engine 180 is the authentication entity 190, and in others, the authentication entity 190 is part of the financial institution server 115 and the authentication service engine 180 is in communication with and controls the authentication entity 190. In the various embodiments, the authentication service engine 180 is configured for communicating with the authentication entity 190 such that the customer's identity as an account owner is authenticated. The authentication is performed using the authentication information provided by the customer to the financial institution checkout widget 160 and communicated from the widget to the financial institution server 115 to the authentication service engine 180.

In one embodiment, for example, the authentication service engine 180 communicates with an authentication server (as authentication entity 190) having similar components as the financial institution server 115. The authentication server, in this example, has a memory storing an authentication application configured for instructing a processing device to access a datastore including multiple customer account profiles.

Referring now to FIG. 2, an online banking profile electronic checkout process 200 according to embodiments of the present invention is shown. In step 210, the customer computer system 110 web browser application 145B accesses a vendor server 105 electronic marketplace 150. As discussed above, the various components of the vendor server 105 and the customer computer system 110 work in conjunction. That is, for example, the web browser application 145B is executed by the processing device 130B and is configured for presenting content, such as one or more web pages, from the electronic marketplace 150 instructions provided by the vendor server 105.

Next, in step 220, the vendor server 105 vendor checkout application 155 provides a checkout interface when the customer chooses to checkout. Thus, during the customer's navigation of the one or more web-pages rendered by the electronic marketplace 150 instructions on the web browser created by the web browser application 145B, the customer is provided the opportunity to checkout with the one or more products chosen by the customer. In some embodiments, for example, as the customer shops on the vendor's electronic marketplace, the customer is given the option to place products into a cart, which is a virtual space configured for temporarily storing information indicating the products that the present customer intends to purchase. Once the customer has chosen to checkout, the checkout interface is provided.

Next, in step 230, the financial institution server checkout widget application 165 renders the financial institution widget 160 in the customer's web browser. In other embodiments, the financial institution server checkout widget application 165 renders the financial institution widget 160 outside the customer's web browser, such as, for example in a separate and distinct pop-up window or a separate and distinct non pop-up window. In other embodiments, however, the financial institution widget 160 is rendered within a space or division of the web browser rendered by the web browser application 145B of the customer computer system 110. For example, in various embodiments, the financial institution widget 160 is rendered as a pop-up within the web browser, a separate layer within the web browser, a separate area within the vendor's webpage, or other similar or dissimilar renderings included within the web browser. As used herein, when denunciating the relationship between the financial institution widget 160 and the web browser, a financial institution widget 160 rendered "proximate" a web browser refers to a rendering alongside, within, on top of, underneath, as a separate program, as a separate window, in conjunction with, as a part of, or any other close relationship, integrated or separate and distinct, between the financial institution widget 160 and the web browser.

Next, in step 240, the authentication service engine 180, in conjunction with an authentication entity 190, authenticates the customer as the owner of one or more financial institution accounts. In different embodiments of the invention, various authentication methods and systems are used. For example, in one embodiment, a configuration of the SiteKey® system is used. SiteKey® is a web-based security system that provides one type of mutual authentication between customers and websites or institution servers such as the financial institution server 200. The SiteKey® system had been owned by RSA Data Security, which is the security division of EMC Corporation, and is headquartered in Bedford, Mass., but the SiteKey® registered trademark is owned by Bank of America Corporation of Charlotte, N.C., the assignee of the present invention. The first step in SiteKey® authentication is the customer identifies him or herself to the authenticating entity, which is, in this case, the financial institution server 200. The customer's identity, in most embodiments, takes the form of a username or alias. If the authenticating entity 190 determines a valid username or alias has been entered by the customer, then the process proceeds. If not, the customer is either asked to enter the username again or is blocked from entering additional usernames. The next step involves the authenticating entity 190 authenticating itself to the customer. This is typically accomplished by the authenticating entity 190 displaying an image and/or a phrase to the customer through the customer computer system 110. The image and/or accompanying phrase is previously chosen by the customer and stored by the authenticating entity 190. If the customer does not recognize the image and/or phrase, the customer should assume the entity with which the customer is communicating is not the actual account provider, but rather, a phishing website or other nefarious entity. As such, should the customer not recognize the image and/or phrase, the customer should immediately abandon the interaction without entering any additional information. If the customer does recognize the image and/or phrase, the customer may deem the entity authentic and proceed. Typically, the next step is for the customer to enter a password that is associated with the previously entered username. If the password does not match the username entered, the authenticating entity 190, in some embodiments, begins the authentication process again, and in others, prevents additional tries to authenticate. If the password matches the entered username, the authenticating entity 190 validates the customer and confirms the customer's validation by communicating the validation to the authentication service engine 180 and/or the financial institution checkout widget 160.

Generally, in various embodiments, the customer account profiles are accessed by the authentication service engine 180 and/or the authentication entity 190 and include, in some embodiments, information regarding multiple customers' accounts such as online banking login information. Online banking login information includes, in some embodiments, for example, one or more usernames, passwords, SiteKey® images and/or phrases for mutual authentication (as discussed below), and/or the like. The authentication service engine 180 and/or authentication entity 190 compares the input received by the financial institution checkout widget 160 and communicated to the financial institution server authentication service engine 180 with the information retrieved from the pre-existing customer online banking profiles. In other embodiments, the financial institution checkout widget 160 communicates the authentication information input by the customer directly to the authentication entity 190 (distinct from the financial institution server in this embodiment), and the authentication entity 190 authenticates the customer as an owner of one or more accounts maintained by the financial institution. In some such embodiments, the authentication entity 190 communicates confirmation of authentication to the financial institution checkout widget application 165 of the financial institution server 115, and in other embodiments, the authentication server communicates confirmation of the authentication directly to the financial institution checkout widget 160 rendered on the customer computer system 110.

In step 250, the financial institution widget application retrieves a customer profile including information regarding the customer's accounts. The customer profile retrieved in step 250 is the same customer profile retrieved and used to authenticate the identity of the customer in step 240 in some embodiments. In other embodiments, the customer profile retrieved in step 250 is separate and distinct from the customer profile retrieved in step 240. Accordingly, for purposes of clarity, the customer profile retrieved in step 240 is referred to hereinafter as the "authentication customer profile," and the customer profile retrieved in step 250 is referred to hereinafter as the "payment customer profile." As mentioned above, the authentication customer profile and the payment customer profile are, in some embodiments, the same profile, and in others, they overlap or one includes the other in addition to supplemental information regarding the customer and/or the customer's accounts. The payment customer profile includes information regarding the customer's one or more accounts. In some embodiments, the information includes account identification information.

In step 260, the financial institution widget 160 displays the available payment account or accounts owned by the authenticated customer and receives customer input regarding which account or accounts from which the customer wishes to deduct payment. As discussed above, the payment customer profile is stored in the financial institution server 115 memory 135C, another datastore within the financial institution server 115, or at a datastore separate from the financial institution server 115. The payment customer profile includes account identification information, which in some embodiments, includes common names associated with a particular customer's accounts. For example, in one embodiment, a customer has a "Credit Card Account", a "Checking Account", and a "Savings Account" included in the payment customer profile. In some embodiments, common names such as those listed above are assigned automatically, such as by the financial institution server 115, and in other embodiments, the customer has the option of modifying the account names as desired. In other embodiments, other types of account identification information are displayed for the customer to identify the account(s) desired for payment. In yet other embodiments, combinations of account identification information are provided to the customer for selection. For example, in one embodiment, the financial institution widget 160 displays both the common name of the customer's accounts in addition to the last four digits of the account numbers associated with the accounts. In other embodiments, various other pieces of information enabling the customer to identify the account are shown individually or in combination.

In step 270, the financial institution server 115 processing device 130C executes the payment service engine 170 configured for communicating transaction information to a payment service. The transaction information, as discussed above, includes, but is not limited to, in various embodiments, information regarding the type and quantity of goods and/or services being purchased as well as information regarding individual and/or total charges for the purchase.

In step 280, the financial institution checkout widget 160 communicates proof of successful payment to the vendor server 105. In some embodiments discussed in further detail below, the financial institution checkout widget 160 communicates proof of successful payment to the vendor server 105 electronic marketplace 150 and/or vendor checkout application 155, which then communicates successful checkout to the customer via the web browser.

Referring now to FIG. 3, a flowchart illustrates additional details of the financial institution server checkout widget application rendering the financial institution widget in the customer's web browser (step 230) in accordance with embodiments of the invention. Before the widget 160 is rendered, the customer has accessed the vendor's electronic marketplace (step 210), the customer has indicated a desire to checkout, and the vendor checkout application has provided a checkout interface in the customer's web browser (step 220). In step 310, the vendor checkout interface accepts customer input choosing to checkout using the financial institution checkout widget 160. In step 320, the vendor checkout interface requests the financial institution checkout widget 160 from the financial institution checkout widget application 165. In step 330, the vendor checkout application 155 communicates transaction information including information related to the goods and/or services being purchased to the financial institution server 115. Then, at step 340, the financial institution server 115 stores the transaction information. Finally, at step 350, the financial institution checkout widget application 165 renders the financial institution checkout widget 160 in a space provided by the web browser application 145B.

Referring now to FIG. 4, a flowchart illustrates additional details of the financial institution widget authenticating the customer as a financial institution account owner (step 240) in accordance with embodiments of the invention. In step 410, the financial institution checkout widget 160 accepts customer input regarding a user identification string such as a username. Next, at step 420, the financial institution checkout widget 160 communicates the user ID to an authentication service engine 180. Then, at step 430, the authentication service engine 180 validates the user ID using a retrieved authentication customer profile. At step 440, the authentication service engine 180 returns mutual authentication tools, based on information from the retrieved authentication customer profile, to the financial institution checkout widget 160. In step 450, the widget 160 receives customer input regarding the customer's mutual authentication acceptance as well as the customer's password. Next, at step 460, the widget 160 communicates the password to the authentication service engine 180. Finally, at step 470, the authentication service engine 180 validates the password using the retrieved authentication customer profile, thereby validating the customer as an account owner.

Referring now to FIG. 5, a flowchart illustrates additional details of the financial institution server running a payment service engine 170 that communicates transaction information to the payment service (step 270) in accordance with embodiments of the invention. First, the widget 160 communicates the customer's desired account for payment to the financial institution server 115. Then, in step 520, the payment service engine is executed by the processing device 130C of the financial institution server 115. Next, at step 530, the payment service engine 170 communicates the transaction information, including information regarding products being purchased as well as transaction cost, to a payment service.

In step 540, the payment service debits the chosen account in the amount of the transaction cost. In some embodiments, the payment service engine 170 causes the chosen account to be debited a greater amount than the transaction cost. In one embodiment, for example, the payment service engine 170 charges the account a fee for use of the financial institution checkout widget and the related processes for checkout and payment discussed herein. In another embodiment, one or more fees are charged to one or more other accounts owned by the customer and/or the vendor and/or one or more third parties. In one embodiment, for example, the payment service engine 170 instructs the payment service to debit the vendor's account or payment in the amount of a predetermined fee based on the number of transactions performed by the financial institution checkout widget 160. In another embodiment, the payment service engine 170 instructs the payment service to debit the vendor's account or payment in the amount of a predetermined fee based on the transaction cost or one or more transactions performed by the financial institution checkout widget 160. At step 550, the payment service engine 170 communicates successful payment to the widget application 165.

Referring now to FIG. 6, a flowchart illustrates additional details of the financial institution checkout widget 160 communicating proof of successful payment to the vendor server 105 (step 280) in accordance with embodiments of the invention. First, in step 610, the widget application communicates a successful payment artifact to the widget 160. Then, at step 620, the widget 160 communicates the successful payment artifact to the vendor checkout interface rendered by the vendor checkout application 155. Next, at step 630, the vendor checkout interface communicates the successful payment artifact to the vendor server 105. In step 640, the vendor server 105, having been informed of the successful payment by the vendor checkout interface, requests proof of the successful payment from the financial institution server 115. Next, at step 650, the financial institution server 115, in response to the vendor server 105 request of step 640, communicates proof of successful payment to the vendor server 105. Finally, at step 660, the vendor checkout application 155 confirms successful payment to the customer by rendering a communication via the vendor checkout interface. In some embodiments, the successful payment confirmation is communicated to the customer outside the vendor checkout interface, such as at a different page within the vendor's electronic marketplace.

Referring now to FIG. 7, a diagram illustrating the financial institution checkout widget 160 is shown. The widget 160 is shown as rendered by a financial institution checkout widget application 165 on a customer computer system 110, such as, for example, as part of a web browser or as a separate window. The illustrated embodiment of the widget 160 includes a checkout widget online ID input window 710, a mutual authentication input window 720, a passcode or password input window 730, a transaction information window 740, and a transaction payment confirmation window 750.

FIGS. 8A through 8D illustrate an example of some of the embodiments of the invention described above with respect to FIGS. 1-7. FIG. 8A is a combination block and flow diagram illustrating a widget initialization procedure 801 of one example embodiment of an online banking profile electronic checkout system 800 according to one embodiment of the invention. As illustrated by step 851, the customer 805 shops online for a vendor's products and then requests to checkout with one or more products. This request is communicated, for example, through the vendor's web page to a vendor checkout server 820. The vendor checkout server 820 includes computer executable program code of a vendor checkout application 822 that is executed by a processor and instructs the processor and/or other devices to perform the functions of the vendor checkout server 820 described herein.

As represented by step 852, the vendor checkout server 820 then presents a checkout webpage 824 to the customer 805. In one embodiment, the vendor checkout webpage 824 is rendered in the web browser of a computing device of the customer 805. For example, the webpage 824 may be rendered according to computer executable program code, such as HTML (hypertext markup language) and/or the like, provided by the vendor checkout server 820 to the customer's computing device.

As represented by step 853, the webpage markup language, or other code, then requests a bank checkout widget 834 from a bank checkout server 830. For example, in one embodiment of the invention, the markup language for the vendor checkout webpage 824 automatically calls, as the webpage 824 is being rendered, the bank checkout server 830 and requests the bank checkout widget 834 from the bank checkout server 830. In another embodiment, instead of calling the bank checkout server 830 automatically, the vendor checkout webpage 824 provides the customer 805 with and option (e.g., a bank checkout link on the web page 824 that the customer can select) to choose to pay via the bank checkout widget 834. If the customer 805 selects the option or otherwise indicates a desire to use the bank checkout widget 834, then the vendor checkout web page 824 calls the bank checkout server 830 to request the bank checkout widget 834. In one example embodiment of the invention, the vendor checkout webpage 824 sends a SAML (Security Assertion Markup Language) artifact or other similar authentication protocol artifact to the bank checkout server 830 when it calls for the bank checkout widget 834. SAML is an XML-based protocol specification that enables two or more servers to share authentication information. In this example, the SAML artifact may authenticate the vendor checkout webpage 824 that is requesting the bank checkout widget 834 from the bank checkout server 830 and identify the particular checkout taking place.

As represented by step 854, in one embodiment, the bank checkout server 830 can then use this SAML artifact or other information received from the vendor checkout webpage 824 identify the vendor checkout server 820 associated with this checkout and to request checkout information, such as items being purchased and checkout amount, from the vendor checkout server 820. The vendor checkout server 820 can use the SAML artifact to authenticate the bank checkout server 830 and identify a particular checkout in progress. As represented by step 855, the vendor checkout server 820 can then securely send information about the particular checkout to the bank checkout server 830. For example, in one embodiment of the invention, the checkout information includes information identifying the one or more products being purchased during the checkout, the total amount of the checkout, costs of individual products being purchased, tax information, and/or the like.

As represented by step 856, the bank checkout server 830 then provides the vendor checkout webpage 824 with the bank checkout widget 834 (which may be in the form of computer-executable program code, such as HTML or another markup language). The bank checkout server 834 may use the checkout information 855 to know how much the customer 805 is to pay the vendor. The bank may also use the checkout information to customize information presented to the customer 805 through the bank checkout widget 834 to show particular aspects of the proposed payment transaction, such as the total amount and/or product(s), to the customer 805 via the bank checkout widget 834. In some embodiments, the bank checkout server 830 also stores some or all of the checkout information in a memory device to use for later customer-approved marketing purposes.

As illustrated in FIGS. 8A through 8D, the bank checkout server 830 generally includes computer executable program code of a bank checkout application 832 that is executed by a processor and instructs the processor and/or other devices to perform the functions of the bank checkout server 830 described herein.

As represented by block 857, the customer's computing device rendering the vendor checkout webpage 824 also renders the bank checkout widget 834 proximate the web page 824 and displays the webpage 824 and the widget 834 to the customer 805. For example, in one embodiment, the widget 834 is presented proximate the webpage 824 via a pop-up window. In other embodiments, the widget 834 is presented proximate the webpage 824 in the form of a distinct space or "div" element embedded in the webpage 824 that is managed by the bank checkout server 830 instead of by the vendor checkout server 820 (which manages other portions of the vendor checkout webpage 824). In other words, in some embodiments, the vendor checkout webpage 824 and the bank checkout widget 834 are presented in a web browser together in a sort of business "mash-up" where different portions of the webpage are presented by different servers of different businesses but are presented in a seemingly seamless environment.

It will be appreciated that in some embodiments of the invention, the bank checkout widget 834 is configured generically so that it can be called by many different vendors and easily incorporated into the checkout web pages of the different vendors. In other words, some embodiments of the invention are configured so that the widget 834 can be called by any vendor having a relationship with bank and knowing the appropriate pass codes, procedures, protocols, and/or addresses used to properly call and initialize the widget 857. As such, some embodiments of the bank checkout server 830 are configured to communicate with a plurality of customer computing devices running a plurality of vendor checkout web pages and then also communicate with a plurality of vendor checkout servers of a plurality of different vendors.

It will also be appreciated by a person of ordinary skill in the art in view of this disclosure that embodiments of the present invention can use the SAML protocol to prevent the vendor checkout server 820 and/or the bank checkout server 830 from being "spoofed" by nefarious entities attempting to commit fraud or access confidential or personal information. Other embodiments of the invention may use other security procedures, systems, and/or protocols that may be known by a person skilled in the art.

FIG. 8B is a combination block and flow diagram illustrating a customer authentication procedure 802 of one example embodiment of an online banking profile electronic checkout system 800 according to an embodiment of the invention. As illustrated by step 861, once the bank checkout widget 834 is initialized and presented to the customer as described above in FIG. 8A, the bank checkout widget 834 then receives customer identification (ID) that, in one embodiment, uniquely identifies the customer 805 amongst a plurality of customers of the bank. In one embodiment of the invention, the bank checkout widget 834 prompts the user to enter an online ID, as shown in FIG. 7. In other embodiments, the bank checkout widget 834 automatically identifies a customer ID residing, for example, in the memory of the customer computing device (e.g., in the form of a cookie or the like).

As represented by step 862, the bank checkout widget 834 then sends the customer ID to the bank checkout server 830. In general, communications between the bank checkout widget 834 and the bank checkout server 830 are encrypted using known encryption techniques or, in some embodiments, proprietary encryption techniques of the bank so that the information is protected even from the vendor.

As represented by step 863, the bank checkout server 830 sends the customer ID to an authentication service 840. In some embodiments, the authentication service 840 is a computerized authentication system maintained by the bank and, in some embodiments, it may even be combined with the bank checkout server 830. In other embodiments, however, the authentication service 840 may be maintained by a third party specializing in customer authentication for the bank's online activities.

In some embodiments of the invention, in response to the customer ID, the authentication service 840 identifies a SiteKey® image and/or phrase (or a similar mutual authentication tool) associated with the customer ID. As represented by step 864, this SiteKey information is provided to the bank checkout server 830, which then provides the SiteKey information to the bank checkout widget 834, as represented by step 865.

As represented by step 866, the bank checkout widget 834 then presents the SiteKey to the customer 805 asking the customer to confirm that it is correct and prompts the customer for the customer's password or other pass code. For example, FIG. 7 illustrates and example of how the bank checkout widget 834 might present the SiteKey to and request a pass code from the customer 805 in accordance with one embodiment of the invention.

As represented by step 867, the customer 805 uses the user input devices of the customer's computing system to interact with the bank checkout widget's graphical user interface to validate the SiteKey and enter a pass code. As represented by step 868, the bank checkout widget 834 then communicates the SiteKey validation and pass code to the bank checkout server 830, which then forwards this information to the authentication service 840, as represented by step 869.

As represented by step 870, if the customer 805 validates the SiteKey and the authentication service 840 determines that the pass code entered by the customer 805 matches stored in its memory and associated with the customer ID, then the authentication service 840 authenticates the customer 805 as being the owner/authorized user of the bank account(s) associated with the customer ID. The authentication decision may then be communicated to the bank checkout server 830.

FIG. 8C is a combination block and flow diagram illustrating a customer account displaying procedure 803 of one example embodiment of an online banking profile electronic checkout system 800 according to an embodiment of the invention. As represented by step 871, once the authentication service 840 authenticates the customer, the authentication service 840 sends the customer's profile information, including customer account information (e.g., account identifiers and, in some cases, account balances) to the bank checkout server 830. In some embodiments of the invention, the bank checkout server 830 obtains the customer profile information from a different system separate and apart from the authentication service 840.

As represented by step 872, the bank checkout server 830 then sends to the bank checkout widget 834 the customer account information identifying one or more of the customer's accounts that the customer can use to pay the vendor for the product(s). As represented by step 873, these accounts are then displayed to the customer 805 via in the bank checkout widget 834, for example, as shown in FIG. 7. In some embodiments of the invention, the bank checkout widget 834 also displays the available balances of each of the accounts displayed so that the customer 805 can make a more educated decision as to which one or more accounts to use for the payment.

FIG. 8D is a combination block and flow diagram illustrating a payment procedure 804 of one example embodiment of an online banking profile electronic checkout system 800 according to an embodiment of the invention. As represented by step 881, once the customer's accounts are displayed, the customer 805 interacts with the bank checkout widget 834 to select an account and authorize payment to the vendor from the selected account. In some embodiments, the customer 805 can select more than one account and specify how much of the payment should come from each of the accounts selected.

As represented by step 882, the selected one or more accounts are then communicated to the bank checkout server 830. As represented by step 883, the bank checkout server 830 then calls a payment service 845 to process the requested payment. In some embodiments, the payment service 845 is a computerized payment system maintained by the bank and, in some embodiments, it may even be combined with the bank checkout server 830. In other embodiments, however, the payment service 845 is maintained, at least in part, by a third party specializing in electronic payment services, such as by Visa®, MasterCard®, or American Express® payment networks working in combination with the bank's electronic payment systems.

If the customer 805 has sufficient funds and there are no other problems with the payment, payment is then either made to the vendor or, at least, authorized/approved and considered pending. As represented by step 884, a confirmation of payment or payment authorization is then communicated to the bank checkout server 830. As represented by step 885, the bank checkout server 830 then communicates successful payment (or successful authorization for payment) to the bank checkout widget 834 using, for example, a SAML artifact or the like.

As represented by step 886, in one embodiment of the invention, the bank checkout widget 834 then uses an HTTP post or other mechanism to provide the SAML artifact to the vendor checkout webpage 824 and ultimately to the vendor checkout server 820, as represented by step 887.

As represented by step 888, the vendor checkout server 820 then uses this SAML artifact to identify the bank checkout server 830 and the checkout transaction and use the SAML artifact to request proof of payment from the bank checkout server 830. As represented by step 889, in response to receiving the SAML artifact, the bank checkout server 830 authenticates the vendor checkout server 820 for the particular checkout via the SAML artifact and then responds with the proof of payment for this particular customer's checkout.

As represented by step 890, the vendor checkout server 820 then renders on the vender checkout webpage 824 an indication that the customer's checkout is complete and was successful. As represented by step 891, this is then displayed to the customer 805.

It should be appreciated that some embodiments of the present invention such as those illustrated in FIGS. 8A through 8D may be configured in this way so as to maintain the security of the customer's personal financial information, purchase information, and account login information or other authenticators and so as to prevent the vendor checkout server 820 and the bank checkout server 830 from being "spoofed" by fraudsters. For example, it should be appreciated that in some embodiments of the invention such as those illustrated in FIGS. 8A through 8D, the vendor, vendor's server, and vendor's webpage never have access to the customer's financial information and online banking authentication information since the customer 805 is always interacting directly with the bank checkout widget 834 (which is maintained by the bank checkout server 830) when this information is being shared, instead of with the portions of the vendor checkout webpage 824 maintained by the vendor checkout server 820. Once payment or payment authorization is confirmed, the vendor checkout server 820 is only provided with an SAML artifact or some other similar secure identifier that the vendor then uses to receive proof of payment from the bank. In this way, the vendor never receives any unnecessary confidential or personal details about the customer's accounts or the customer's authenticators and the customer 805 does not have to establish an account with the vendor or even provide a card or account number to the vendor.

Although the vendor traditionally accepts the risk of payments not being made in a fraudulent online transaction, in some embodiments of the invention, the bank guarantees the payment to the vendor when the bank checkout widget 834 is used for an online payment. This guarantee may be stored be automatically stored by the bank in its system's memory and payment may be automatically made to the vendor, despite fraud by the customer 805 or by a person posing as the customer 805.

Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As used herein, unless specifically limited by the context, the term "transaction" may refer to a purchase of goods and/or services (collectively referred to herein as "products"), a withdrawal of funds, an electronic transfer of funds, a payment transaction, a credit transaction, a PIN change transaction or other interaction between a cardholder and the bank maintained a bank account owned by the cardholder. As used herein, a "bank card" refers to a credit card, debit card, ATM card, check card, or the like, or other payment device such as, but not limited to, those discussed above that are not cards. An "account" or "bank account" refers to a credit account, debit account, deposit account, demand deposit account (DDA), checking account, or the like. Although the phrases "bank card" and "bank account" include the term "bank," the card or payment device need not be issued by a bank, and the account need not be maintained by a bank and may instead be issued by and/or maintained by other financial institutions.

As used herein, the term "online financial institution profile" refers to one or more profiles related to and containing online authentication and payment information related to one or more customers of a financial institution, the customers being owners of one or more online accounts maintained by the institution. "Online financial institution profile" includes one or both of "payment customer profiles" and "authentication customer profiles" discussed in detail above.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" or "memory" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor/processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A method for providing an electronic checkout using an online financial institution profile for a customer of a financial institution interacting with an electronic marketplace of a vendor using a customer computer system, the customer desiring to purchase one or more products via the electronic marketplace, the method comprising:
    using a processing device of the customer computer system operating computer program code instructions stored in a non-transitory computer readable medium, wherein said computer program code instructions are structured to cause said processing device of the customer computer system to:
        render a financial institution widget proximate a web browser running on the customer computer system;
        initiate authentication of the customer as a financial institution account owner based at least in part on the customer's online financial institution profile and on authentication input received from the customer via the financial institution widget;
        in response to successful authentication of the customer as a financial institution account owner, initiate retrieval, from the online financial institution profile, identification information corresponding to two or more customer accounts maintained by the financial institution;
        present, before receiving selection of one of the customer accounts, the identification information corresponding to the two or more customer accounts to the customer;
        receive a selection from the customer of one of the two or more customer accounts to use as a payment account;
        initiate processing of a payment for the one or more products using the payment account; and
        initiate communication of proof of a successful payment to the vendor.

2. The method of claim 1, further comprising:
    receiving, before rendering the financial institution widget, a request to render the financial institution widget.

3. The method of claim 1, further comprising:
    receiving, before rendering the financial institution widget, transaction information comprising information related to the one or more products being purchased.

4. The method of claim 1, wherein authenticating the customer as a financial institution account owner comprises:
    retrieving the online financial institution profile comprising online financial institution authentication information;
    receiving customer authentication input; and
    comparing the retrieved online financial institution authentication information with the received customer authentication input thereby authenticating the customer as a financial institution account owner.

5. The method of claim 4, wherein the online authentication information comprises a stored username, a stored pass code, and at least one stored mutual authentication tool, and wherein receiving customer authentication input comprises receiving a customer username, a customer pass code, and a customer acceptance of the at least one stored mutual authentication tool.

6. The method of claim 1, further comprising:
receiving transaction information about the purchase transaction from the vendor; and
storing the transaction information in a memory device.

7. The method of claim 6, wherein the transaction information comprises total cost and wherein the processing the payment comprises:
communicating the total cost to the payment service.

8. The method of claim 7, wherein the processing the payment further comprises:
receiving confirmation from the payment service of successful payment or payment authorization from one or more of the customer's accounts to a vendor account for an amount based at least in part on the total cost.

9. The method of claim 1, wherein communicating proof of a successful payment to the vendor comprises:
communicating a successful payment artifact to the financial institution widget for communication from the financial institution widget to the vendor electronic marketplace and thereby a vendor server;
receiving a request for proof of payment from the vendor server, the request based at least in part on the successful payment artifact; and
communicating proof of successful payment or payment authorization to the vendor server.

10. The method of claim 9, wherein communicating proof of a successful payment to the vendor further comprises:
instructing the vendor server to confirm successful payment or payment authorization to the customer using the vendor electronic marketplace.

11. The method of claim 1, wherein rendering the financial institution widget proximate the web browser running on the customer computer system comprises:
rendering the financial institution widget proximate a vendor's checkout webpage running on the customer computer system.

12. The method of claim 11, wherein rendering the financial institution widget proximate a vendor's checkout webpage running on the customer computer system comprises:
rendering the financial institution widget within the vendor's checkout webpage.

13. The method of claim 1, wherein the financial institution comprises a bank, and wherein the customer's online financial institution profile comprises a customer's online banking profile used to authenticate the customer into an account of an online banking service.

14. A computer program product comprising a non-transitory computer-readable medium comprising computer executable instructions, the instructions for providing an electronic checkout using an online financial institution profile for a customer of a financial institution interacting with an electronic marketplace of a vendor, the customer desiring to purchase one or more products via the electronic marketplace, the instructions comprising:
instructions for rendering a financial institution widget proximate a web browser running on a customer computer system;
instructions for initiating authentication of the customer as a financial institution account owner based at least in part on the customer's online financial institution profile and on authentication input received from the customer via the financial institution widget;
instructions for, in response to successful authentication of the customer as a financial institution account owner, initiating retrieval, from the online financial institution profile, identification information corresponding to two or more customer accounts maintained by the financial institution;
instructions for presenting, before receiving selection of one of the customer accounts, the identification information corresponding to the two or more customer accounts to the customer;
instructions for receiving a selection from the customer of one of the two or more customer accounts to use as a payment account;
instructions for initiating processing of a payment for the one or more products using the payment account; and
instructions for initiating communication of proof of a successful payment to the vendor.

15. The computer program product of claim 14, wherein the instructions further comprise:
instructions for receiving a request to render the financial institution checkout widget.

16. The computer program product of claim 14, wherein the instructions further comprise:
instructions for receiving transaction information comprising information related to the one or more products being purchased.

17. The computer program product of claim 14, wherein the instructions for authenticating the customer as a financial institution account owner comprise:
instructions for retrieving the online financial institution profile comprising online financial institution authentication information;
instructions for receiving customer authentication input; and
instructions for comparing the retrieved online financial institution authentication information with the received customer authentication input thereby authenticating the customer as a financial institution account owner.

18. The computer program product of claim 17, wherein the online authentication information comprises a stored username, a stored pass code, and at least one stored mutual authentication tool, and
wherein the instructions for receiving customer authentication input comprises instructions for receiving a customer username, a customer pass code, and a customer acceptance of the at least one stored mutual authentication tool.

19. The computer program product of claim 14, wherein the instructions further comprise:
instructions for receiving transaction information about the purchase transaction from the vendor; and
instructions for storing the transaction information in a memory device.

20. The computer program product of claim 19, wherein the transaction information comprises total cost and wherein the instructions for processing the payment comprise:
communicating the total cost to the payment service.

21. The computer program product of claim 20, wherein the instructions for processing the payment further comprise:
instructions for receiving confirmation from the payment service of successful payment or payment authorization from one or more of the customer's accounts to a vendor account for an amount based at least in part on the total cost.

22. The computer program product of claim 14, wherein instructions for communicating proof of a successful payment to the vendor comprise:
   instructions for communicating a successful payment artifact to the financial institution widget for communication from the financial institution widget to the vendor electronic marketplace and thereby a vendor server;
   instructions for receiving a request for proof of payment from the vendor server, the request based at least in part on the successful payment artifact; and
   instructions for communicating proof of successful payment or payment authorization to the vendor server.

23. The computer program product of claim 14, wherein the instructions for rendering the financial institution widget proximate the web browser running on the customer computer system comprise:
   instructions for rendering the financial institution widget proximate a vendor's checkout webpage running on the customer computer system.

24. The computer program product of claim 23, wherein instructions for rendering the financial institution widget proximate a vendor's checkout webpage running on the customer computer system comprise:
   instructions for rendering the financial institution widget within the vendor's checkout webpage.

25. The computer program product of claim 14, wherein the financial institution comprises a bank, and wherein the customer's online financial institution profile comprises the customer's online banking profile used to authenticate the customer into an account of an online banking service.

26. A customer computer system for providing an electronic checkout using an online financial institution profile for a customer of a financial institution interacting with an electronic marketplace of a vendor, the customer desiring to purchase one or more products via the electronic marketplace, the customer computer system comprising a processing device operating computer program code instructions stored in a non-transitory computer readable medium, wherein said computer program code instructions are structured to cause said processing device to:
   render a financial institution widget proximate a web browser running on the customer computer system, the financial institution widget configured to receive authentication input from the customer;
   initiate authentication of the customer as a financial institution account owner based at least in part on the customer's online financial institution profile and on the authentication input received from the customer via the financial institution widget;
   in response to successful authentication of the customer as a financial institution account owner, initiate retrieval, from the online financial institution profile, identification information corresponding to two or more customer accounts maintained by the financial institution;
   present, before receiving selection of one of the customer accounts, the identification information corresponding to the two or more customer accounts to the customer;
   receive a selection from the customer of one of the two or more customer accounts to use as a payment account;
   initiate processing of a payment for the one or more products using the payment account; and
   initiate communication of proof of a successful payment to the vendor.

27. The system of claim 26, wherein authenticating the customer as a financial institution account owner comprises:
   retrieving the online financial institution profile comprising online financial institution authentication information;
   receiving customer authentication input; and
   comparing the retrieved online financial institution authentication information with the received customer authentication input thereby authenticating the customer as a financial institution account owner.

28. The system of claim 26, wherein communicating proof of a successful payment to the vendor comprises:
   communicating a successful payment artifact to the financial institution widget for communication from the financial institution widget to the electronic marketplace and thereby a vendor server;
   receiving a request for proof of payment from the vendor server, the request based at least in part on the successful payment artifact; and
   communicating proof of successful payment to the vendor server.

29. A system for providing an electronic checkout using an online financial institution profile for a customer of a financial institution interacting with an electronic marketplace of a vendor, the customer desiring to purchase one or more products via the electronic marketplace, the system comprising:
   a financial institution server comprising:
      a non-transitory memory configured for storing computer readable instructions;
      a processing device configured for executing one or more of the computer readable instructions to:
         initiate rendering of a financial institution widget proximate a vendor web page running on a customer computer system, and
         authenticate the customer as a financial institution account owner based at least in part on the customer's online financial institution profile and on authentication input received from the customer via the financial institution widget;
         in response to successful authentication of the customer as a financial institution account owner, retrieve, from the online financial institution profile, identification information corresponding to two or more customer accounts maintained by the financial institution;
         initiate presentation, before customer selection of one of the customer accounts, the identification information corresponding to the two or more customer accounts to the customer;
         receive, from the customer computer system, a selection from the customer of one of the two or more customer accounts to use as a payment account;
         process a payment for the one or more products based at least in part on the payment; and
         initiate communication of proof of a successful payment to the vendor.

* * * * *